Patented Feb. 10, 1948

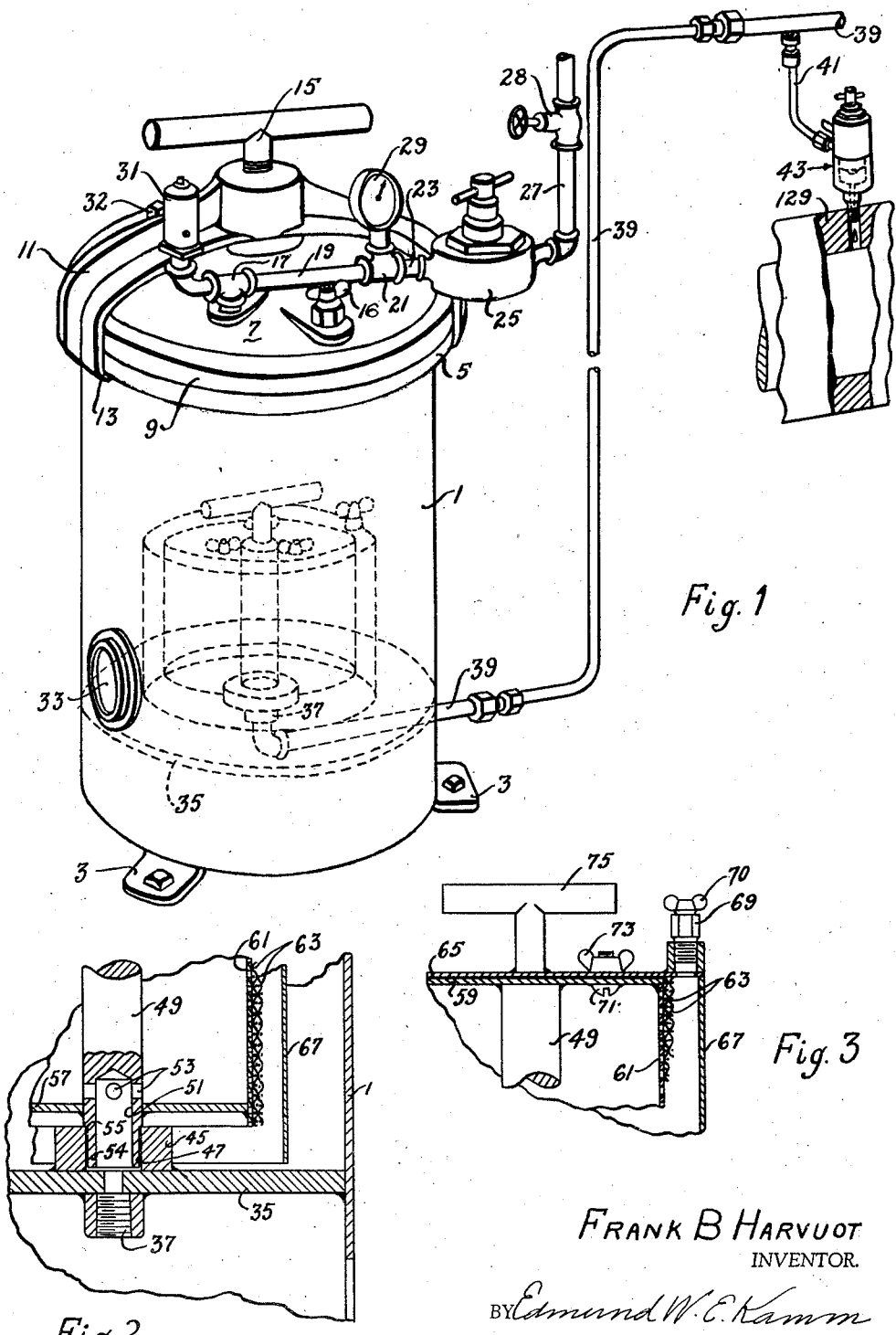

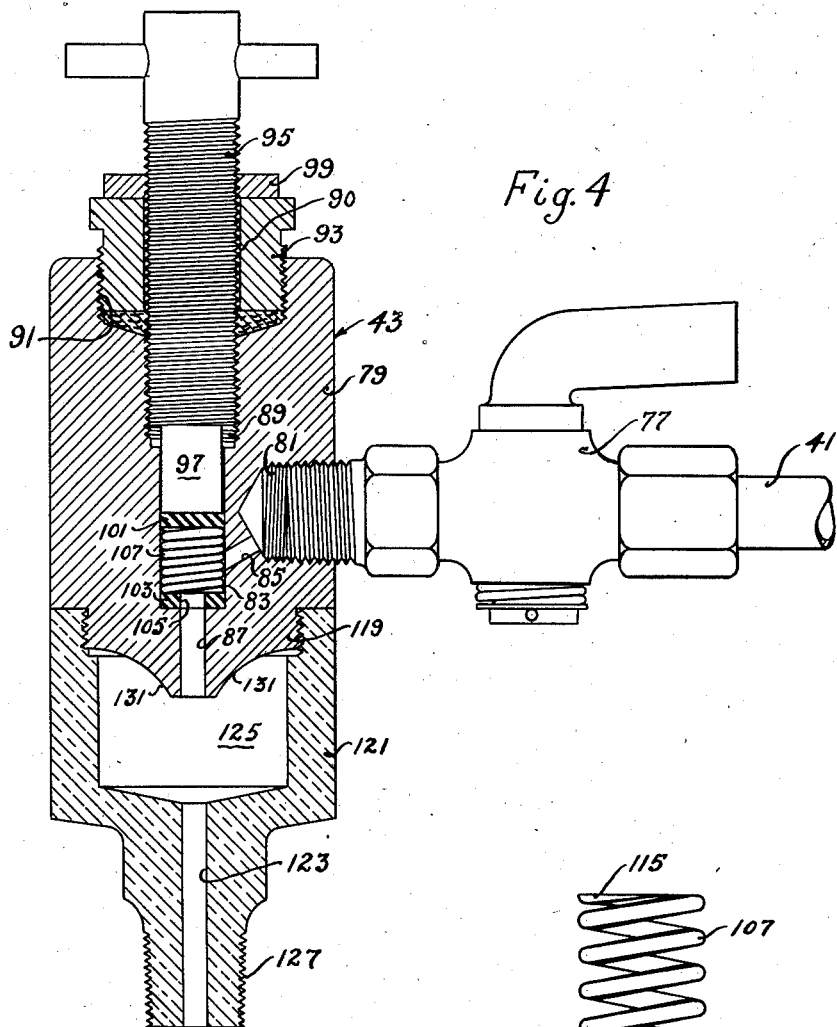
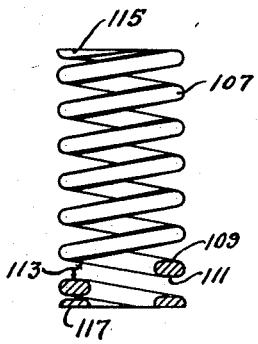
Frank B. Harvuot
INVENTOR.
BY Edmund W. C. Kamm
ATTORNEY.

2,435,832

UNITED STATES PATENT OFFICE 2,435,832

LUBRICANT FILTERING AND DISPENSING TANK

Frank B. Harvuot, Fort Wayne, Ind., assignor to Bowser, Inc., a corporation of Indiana Application July 27, 1942, Serial No. 452,513

5 Claims. (Cl. 184—55)

This invention relates to a lubrication system for dispensing small flows of lubricant to bearings. More specifically, it relates to a combination pressure tank and filter to which air is applied under pressure and from which lubricating oil is forced to an oiler which controls the flow of lubricant to the bearing.

An object of the invention is to provide a lubricating system which will dispense lubricant at a very slow but controlled rate of flow.

Another object of the invention is to provide a lubricating system which will provide lubrication at various points at the rate required at each point.

Yet another object of the invention is to provide a storage tank having a filter for filtering the lubricant as it leaves the tank.

A further object of the device is to provide an air operated storage tank which will dispense most of the lubricant contained therein.

Another object of the invention is to provide an air feed storage tank which is equipped with a filter for the liquid to be discharged.

Another object of the invention is to provide a lubrication system comprising a storage tank, a filter and a fine feed oiler in which only filtered oil is supplied to the oiler or lubricator.

Yet another object of the invention is to provide a lubricator which is readily regulated to dispense various small amounts of oil.

Still another object of the invention is to provide an oiler in which the flow regulating element or valve is a spring.

Another object of the invention is to provide an oiler of the kind described in which the spring may be compressed more or less to regulate the rate of feed of the oil.

A further object of the invention is to provide a lubricator in which the discharge is visible and which is adjustable to vary the discharge.

These and other objects will become apparent from a study of this specification and the drawings which are attached hereto and made a part hereof and in which:

Figure 1 is an isometric view of the lubrication system including the storage tank and an oiler.

Figure 2 is a view with parts broken away of the filter and its mounting means.

Figure 3 is a view with parts broken away showing the upper portion of the filter and the vent valve.

Figure 4 is a sectional view of the lubricant dispenser or oiler.

Figure 5 is a view partly in section, showing the spring type valve.

Referring now to Figure 1, the numeral 1 indicates a pressure type of lubricant storage tank which is provided with feet 3 and an upper flange 5. A cover 7 having a complementary flange 9 is held in place on a suitable gasket (not shown) by a clamp 11 which has projections 13 adapted to engage the tank flange and a hand screw 15 which is adapted to force the cover down on the gasket.

The cover if fitted with a vent valve 16 and with a T 17 which is attached by a pipe 19, T 21 and nipple 23 to a pressure reducing valve 25 and this in turn is connected to a high pressure air line 27 which has a shut-off valve 28. The T 21 carries a pressure gauge 29 while T 17 is connected to a relief valve 31. A fill plug 32 is provided in the cover.

A sight glass 33 is fitted in the side of tank 1 near the bottom thereof so that the level of oil in the tank may be observed.

The bottom 35 of the tank is provided with an outlet 37 which is connected by pipes 39 and 41 with the oiler 43.

The bottom of the tank is provided with a boss 45 which has an opening 47 therein.

The filter element comprises a central rod 49 which is provided with a bore 51 at its lower end and which has radial holes 53 communicating with the upper portion of the axial bore. The rod is provided with a reduced diameter 54 at its lower end to form a shoulder 55 which rests upon the boss 45.

Two circular plates 57 and 59 are fixed to the rod at its lower and upper ends respectively, the lower plate being disposed between shoulder 55 and the radial holes 53. A cylinder 61 of perforated metal is fixed to the peripheries of the plates and serves to support a double layer of fine wire mesh screen 63. This material is preferably 200 mesh bronze gauze. The upper ends of cylinder 61 and screen are substantially flush with the top plate 59 while the lower ends extend a short distance below the bottom plate 57.

A circular plate 65 is adapted to overlie the top plate 59 and has fixed to it a depending cylinder 67 which extends to a point below the screen and to within about 1/16" from the bottom 35. This cup is air tight and is provided with a vent valve 69 at its upper end which may be opened and closed by manipulating the member 70.

A series of short screws 71 fitted with wing nuts 73 hold the plate 65 in position on the plate 59 and a handle 75 is fixed to plate 65 so that the cup and filter may be readily removed from the tank.

Referring now to Figures 4 and 5, numeral 77 is a plug cock which is connected to line 41 and to the oiler 43. The latter comprises a body 79 which is provided with a tapped inlet 81 and a spring or valve chamber 83 which is connected to the inlet by a bore 85. A discharge opening 87 extends downwardly from chamber 83 while an enlarged and threaded bore 89 extends upwardly from the chamber and merges with an even larger, threaded bore 91.

A packing nut 93 is received in bore 91 and is provided with a smooth internal bore 90 to receive the adjusting screw 95 which carries a reduced, cylindrical extension 97 at its lower end. A jam nut 99 is received on the adjusting screw and is adapted to be drawn up against the packing nut to hold the screw adjustment.

The lower face of the extension 97 rests upon a plug 101 of synthetic rubber which is resistant to oils or other suitable yieldable material while a perforated washer 103 of the same material is disposed on the bottom of chamber 89, the hole 105 in the washer being in alignment with the discharge opening 87. The control valve or spring 107 is confined between these two washers and the ends of the spring are sealed against passage of liquid around them.

As shown in Figure 5, the spring or valve comprises a helical coil of spring wire which is flattened in cross-section to provide flat upper and lower faces 109, 111 on each coil. There is accordingly provided by this valve a helical metering orifice 113 which has substantially parallel upper and lower walls. By compressing the spring, the orifice is reduced in area and vice versa.

The ends 115 and 117 of the spring are faced off so as to be perpendicular to the longitudinal axis of the spring to afford good seats on the plug and washer 101, 103.

A threaded projection 119 is formed on the lower end of the body 79 and an internally threaded discharge member 121 is screwed thereon. This member is made of transparent material such as an acrylic plastic so that the drops of oil passing between the discharge tube 87 and the discharge bore 123 leading to the bearing will be visible to an observer. The member 121 is formed with a chamber 125 between ducts 87 and 123 in which oil will collect in the event duct 123 or one connecting therewith becomes plugged or if the rate of flow through valve 107 is too great.

The lower end 127 of the member is threaded externally so as to enter a threaded hole in the bearing 129.

As shown in Figure 4, the lower end 131 of the body 43 is tapered downwardly from the periphery of 119 toward the outlet of discharge duct 87 to prevent the oil from spreading in a film over this surface.

*Operation*

In placing the system in service, it is necessary to remove the cover 7 of the pressure tank 1 and open the air valve 69 on the inverted cup 67. Thereafter the required amount of oil is placed in the tank, and with valve 69 open, it will fill the space under the cover and will also pass through the filter screen 63 and the screen 61 to fill the chamber inside the filter.

In practice, the tank 1 is designed to hold about six quarts and the lubricant used should not exceed 350 S. S. U. at 100 degrees Fahrenheit. Usually S. A. E. #10 or #20 is used for the screen and valve here shown.

When the tank has been filled and no more air issues from valve 69, this valve is closed and the cover 7 is replaced. The vent valve 16 on the cover is opened, as is the valve 28 on the high pressure air line 27, which can supply air much faster and in greater volume than the small vent valve can release it. If this is not the case, then the vent valve should be only partially opened and the regulator 25 is adjusted until the proper pressure, usually 5 to 8 pounds per square inch, is indicated upon the gauge 29. The vent valve 16 is then closed and the gauge 29 is again checked to see that the pressure is maintained. Thereafter, the individual oilers are adjusted by turning the adjusting screw 95 to compress or relieve spring valve 5, until the required number of drops a minute are seen through the transparent member 121.

The valve 107 is usually of steel wire having eight coils and is of .030 x .055 cross-section with ⅛" minimum inside diameter and about ¼" outside diameter. It is about ½" long when free and ¼" long when closed. With a spring valve constructed on these dimensions, a minimum flow of 1½ drops a minute can be attained using a 140 S. S. U. oil at 100 degrees Fahrenheit and with a pressure of 5 p. s. i. on the oiler.

This type of valve has the advantage of maintaining a constant flow for long periods of time whereas the usual needle valve is comparatively erratic.

The oil in passing from tank 1 is forced through the small opening between the bottom of the cup 67 and the tank bottom 35, through the filter screens 63, 61, through the radial holes 53, the bore 51 and discharge 37 into pipes 39 and 41. Here it enters the cock 77 and passes through duct 85 into the spring valve chamber and around the exterior of the spring valve.

The setting of the spring valve determines the rate of flow of the oil through the helical orifice 113. The oil which passes through the orifice will move downwardly through hole 105 in washer 103, through duct 87 to the end thereof where it forms into a drop and falls through the chamber 125 and flows into the duct 123 and thence to the bearing 129.

The washer or plug 101 seals the upper end of the chamber but should any oil escape it would be blocked off by the packing 91. The washer 103 seals the lower end of the chamber outside of the spring so that no lubricant will by-pass the orifice 113.

Once a setting is obtained, the jam nut 99 is tightened against the packing nut 93 to hold the adjusting screw.

It is important that the oil be filtered before it is sent to the oilers because the distance between the faces on the adjacent coils of the spring are so small that the helical orifice can be plugged very easily.

After the system has been placed in operation, the liquid level will fall as oil is dispensed, and oil will continue to be dispensed until the liquid level reaches the lower edge of the inverted cup 67. However, when the liquid seal is broken, air will replace the liquid in the space under the cup and it will be necessary to start the system again by removing the cover and opening the valve 69 in the manner described above. It is obvious to those skilled in the art that, if the cup 67 were omitted, air would pass through the filter as soon as the liquid level dropped below the top of the filter. This would result in discharging the oil contained inside the screen through to the bearings, after which air or an oil and air mixture would be supplied to the bearings instead of lubricant while at the same time a substantial quantity of oil would remain in the tank. This results from the fact that air will pass through the filter with much greater ease than lubricant. To avoid this effect, air is prevented from entering the filter until the oil supply in the tank is substantially exhausted.

However, if the level does not uncover the lower edge of the cup, the tank can be filled by closing valve 28, opening vent valve 16 and removing the fill plug 32. When the chamber is filled again, valve 16 may be closed and valve 28 may be again opened to continue the operation of the system.

The parts of both the oiler and the pressure tank are easily removable for cleaning and repair.

With respect to the pressure carried on the tank, this factor is governed by the location of the tank with respect to the oilers. If the latter are disposed above the tank, the pressure on the tank must necessarily be greater to apply the required pressure at the oiler. This should be about 5 p. s. i. at the oiler.

The viscosity of the oil also affects the rate of flow through the spring valve so that a lower rate of flow can be attained with a heavy oil than with a light oil.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a storage and filtering device, the combination of a storage tank for lubricant, means for maintaining a constant fluid pressure in said tank, comprising a gas pressure connection adjacent the top of the tank, said tank having an outlet for lubricant, a filter disposed in said tank and connected to discharge filtered oil to said outlet, a closed top container disposed in said tank and enclosing said filter, said container having an inlet for lubricant adjacent the bottom of said tank.

2. In a storage and filtering device, the combination of a storage tank for lubricant, means for maintaining a constant fluid pressure in said tank, comprising a gas pressure connection adjacent the top of the tank, said tank having an outlet for lubricant, a filter disposed in said tank and connected to discharge filtered oil to said outlet, a closed top container disposed in said tank and enclosing said filter, said container having an inlet for lubricant adjacent the bottom of said tank, and a vent valve at the top of said container.

3. In a storage and filtering device, the combination of a pressure tank, having a liquid outlet at the bottom thereof, a filter in said tank connected to discharge into said outlet, an inverted chamber disposed over said filter and having its lower edge disposed closely adjacent the bottom of said tank so that a liquid seal will be maintained until liquid in the tank reaches a low level, a high pressure gas supply, a pressure regulating device connected to said supply and connected to discharge into the top of said tank.

4. In a storage and filtering device, the combination of a pressure tank having a removable top and having a liquid outlet at the bottom thereof, a filter in said tank connected to said outlet, an inverted chamber disposed over said filter and having its lower edge disposed closely adjacent the bottom of said tank so that a liquid seal will be maintained until liquid in the tank reaches a low level, a normally closed gas vent in the top of said chamber, a high pressure gas supply, a pressure regulating device connected to said supply and to said tank near the top thereof for applying gas at substantially constant pressure to said liquid.

5. In a storage and filtering device, the combination of a pressure tank, having an outlet for liquid at the bottom thereof, a filter in said tank connected to said outlet, an inverted chamber disposed over said filter and having its lower edge disposed closely adjacent the bottom of said tank so that a liquid seal will be maintained until liquid in the tank reaches a low level, a normally closed gas vent in the top of said chamber, a high pressure gas supply, a pressure regulating device connected to said supply and connected to discharge into the top of said tank and a vent valve in the top of said tank.

FRANK B. HARVUOT.

REFERENCES CITED

The following references are of record in the file of this patent:

UNITED STATES PATENTS

| Number | Name | Date |
| --- | --- | --- |
| 401,057 | Perkins | Apr. 9, 1889 |
| 640,079 | Bangs | Dec. 26, 1899 |
| 1,237,482 | Dalen | Aug. 21, 1917 |
| 1,270,042 | Moisant | June 18, 1918 |
| 1,509,180 | Severson | Sept. 23, 1924 |
| 1,540,683 | Durrin | June 2, 1925 |
| 1,651,866 | Bowers | Dec. 6, 1927 |
| 1,758,251 | Davis | May 13, 1930 |
| 1,905,527 | Thomas | Apr. 25, 1933 |
| 1,923,408 | Zerk | Aug. 22, 1933 |
| 2,089,523 | Wupper | Aug. 10, 1937 |

FOREIGN PATENTS

| Number | Country | Date |
| --- | --- | --- |
| 16,729 | Great Britain | 1894 |